United States Patent [19]
Pitner

[11] 3,804,541
[45] Apr. 16, 1974

[54] ASSEMBLY OF A CONNECTING ELEMENT AND A TORQUE TRANSMITTING ELEMENT

[75] Inventor: Alfred Pitner, Paris, France

[73] Assignee: Nadella, Ruel-Malmaison, France; a part interest

[22] Filed: Oct. 5, 1970

[21] Appl. No.: 77,911

[30] Foreign Application Priority Data
Nov. 17, 1969 France .......................... 6939423

[52] U.S. Cl. ............................................. 287/53 R
[51] Int. Cl. ............................................... F16d 1/06
[58] Field of Search ....... 287/53 R, 52.02, 118, 110; 279/84

[56] References Cited
UNITED STATES PATENTS

| 575,542 | 1/1897 | Brooks | 287/118 |
|---|---|---|---|
| 1,830,976 | 11/1931 | Ashworth | 287/52.02 |
| 2,270,895 | 1/1942 | Rabe | 287/52.02 |
| 1,683,157 | 9/1928 | Brown | 287/52.02 |
| 1,787,017 | 12/1930 | Paul | 287/52.02 |
| 577,701 | 2/1897 | Wilson | 287/53 R |
| 287,188 | 10/1883 | Sterling | 279/84 |
| 1,641,038 | 8/1927 | Koppin | 287/118 |
| 3,501,928 | 3/1970 | Pitner | 287/53 R |

Primary Examiner—Andrew V. Kundrat
Attorney, Agent, or Firm—Robert E. Burns; Emmanuel J. Lobato

[57] ABSTRACT

Assembly of a shaft and a connecting element comprising a split collar of sheet metal having ear portions. The split is wide enough to allow the shaft to pass radially therethrough. An intermediate member is disposed in the split and bears against the shaft. A bolt and nut tightening means extends through the ear portions and the intermediate member co-operates with faces on the ear portions and/or with a face on the tightening means. The arrangement is such that a relative displacement between the ear portions, the intermediate member and the tightening means causes the shaft to be gripped inside the collar.

20 Claims, 12 Drawing Figures

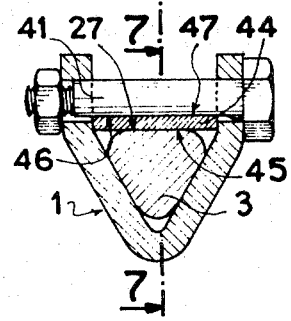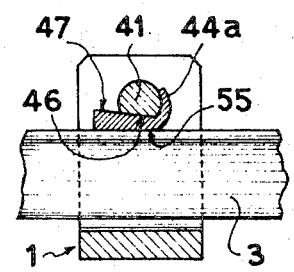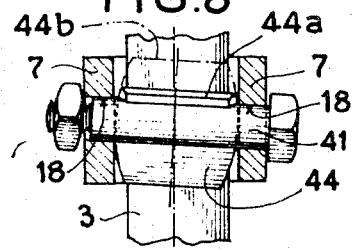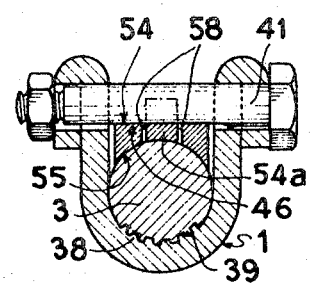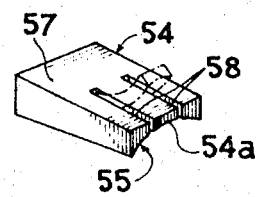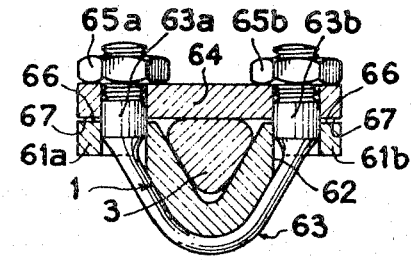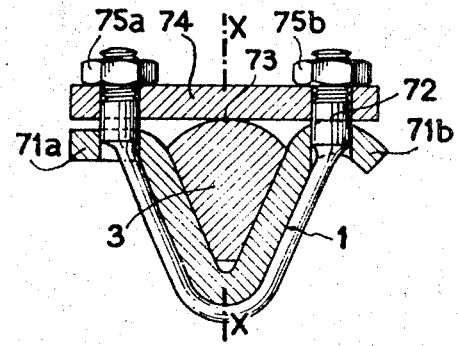

ASSEMBLY OF A CONNECTING ELEMENT AND A TORQUE TRANSMITTING ELEMENT

The present invention relates to an assembly of a shaft with the collar of a connecting element, as a yoke of a universal joint, which ensures a play-free transmission between the collar and the shaft.

In such an assembly, when any relative axial movement between the parts is impossible, for example owing to their size and position, it must be possible to place the shaft in the collar by a transverse movement and this requires that the collar have a longitudinal slot whose width is determined by the transverse dimensions of the shaft. The fixing of the shaft in the collar, which is usually forged or cast, requires extensive machining, that is, the cutting away of material, to form the faces which co-act with faces on the shaft with precision since usually it is impossible to deform the parts to ensure a good contact of the drive transmitting faces. Moreover, an additional bar or cap is employed to fill the longitudinal slot in the collar and this bar or cap also requires precise machining to ensure a good fixing of the shaft to the collar.

The object of the invention is to avoid these drawbacks by the use of a sheet metal collar and sheet-metal auxiliary elements which can consequently be put into the required shape without cutting away material and are, moreover, deformable, which ensures an intimate contact between the faces and consequently an improved transmission of the drive with a substantial reduction in manufacturing and assembly costs.

The invention provides an assembly of a shaft or other torque transmitting element and a connecting element having a split collar which partly surrounds the shaft, the width of the split being sufficient to permit positioning the collar by a relative radial displacement of the shaft and the collar, wherein the collar is coldformed from sheet metal and terminates in two ear portions through which extend tightening means and with which an intermediate holding member is in contact, said intermediate member having a face which marries up with the shaft and at least one other face which co-operates with a part of the face of the ear portions and-/or of the tightening means, whereby a relative displacement between the ear portions, the intermediate member and the tightening means results in the shaft being gripped inside the collar.

In combination with the ear portions, which are disposed roughly parallel to each other, the intermediate member can have a U- or V-shape, the two branches of which terminate in an oblique face in contact with an inner face of the respective ear portions which has the same obliquity, the obliquity being such that resiliently urging the ear portions towards each other, for example by screwing the tightening means extending through the ear portions, produces a radial compression of the base of the U or V in contact with the shaft.

The intermediate member can also have a generally flat shape, with if desired a slight curvature so that, under the action of the tightening means connected to the ear portions or to the whole of the collar, there result, both for said intermediate member and said collar, deformations producing an intimate contact between the shaft and the collar.

The intermediate member can also be directly inserted between the tightening means and the shaft, two of the faces in mutual contact creating by a relative displacement a wedging effect which tends to radially grip the shaft inside the collar.

The aforementioned wedging effect can be due to tightening means in the form of a key, known as a cotter-pin, whose oblique face co-operates with a planar face which is formed on the intermediate member and is parallel to the axis of the shaft. It is also possible to employ, in combination with cylindrical tightening means, a wedge-shape member which produces the radial compression of the shaft by a longitudinal displacement with respect to the shaft.

The assembly according to the invention is in particular applicable to a yoke for a universal joint constructed in accordance with the teachings of U.S. Pat. No. 3 478 540 and U.S. application Ser. No. 677 625. In such an application, the assembly results in a precise transmission of static or dynamic torque with no play or resilient yielding.

Further features and advantages of the invention will be apparent from the ensuing description with reference to the accompanying drawings.

In the drawings :

FIG. 6 is a view of another embodiment of the assembly;

FIG. 7 is a sectional view taken along line 7—7 of FIG. 6;

FIG. 8 is a plan view showing the convex shape of the edges of the intermediate member of the embodiment shown in FIG. 6;

FIG. 9 is a cross-sectional view of another embodiment of the assembly;

FIG. 10 is a perspective view of the shape of the intermediate member employed in the embodiment shown in FIG. 9;

FIG. 11 is a cross-sectional view of another embodiment of the assembly, and

FIG. 12 is a cross-sectional view of a modification of the embodiment shown in FIG. 11.

Figure 1:
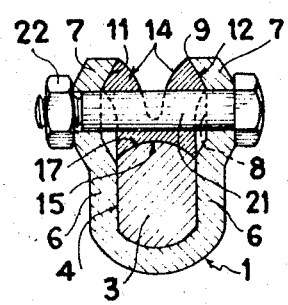
FIG. 1 is a cross-sectional view of the assembly of a collar of a universal joint yoke and a shaft.
Figure 2:
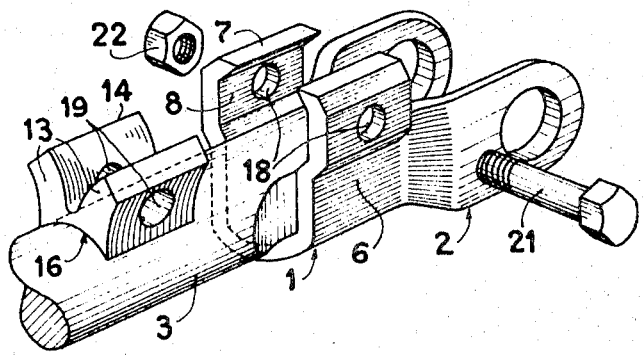
FIG. 2 is an exploded perspective view of the parts shown in FIG. 1 before assembly.

It will be observed that in all the Figures of the drawing, the collar 1, which has a generally U- or V-sectioned shape, is simply and economically produced by blanking, rolling and/or bending sheet metal so that the connecting element, for example the universal joint yoke 2 shown having two branch portions defining apertures for receiving trunnions of a cross-member in FIGS. 1 and 2, can be entirely produced by these operations, as described in French Pat. No. 515 051. The intermediate holding member 14 or 24 shown in FIGS. 1 and 3 can also be produced by blanking and bending sheet metal. This affords with sufficient precision the desired advantage very cheaply owing to the utilisation on presses of a suitable tooling which operates more or less automatically, the sole machining operations, if any, being restricted to slight rectifications so as to obtain, for example in the case of splines, more precise profiles, the deformation made possible by the utilisation of sheet metal at the moment of bringing into action the tightening means ensuring the intimate contact necessary for the correct performance of the connection.

In FIG. 1, the collar 1 of generally U-sectioned shape of a universal joint yoke 2 is assembled with a shaft 3 having two parallel flat faces 4. The side portions 6 of the collar 1 are extended in the form of two ear portions 7 which have such shape that their inner face has the shape of a shallow recess 8 so that the width of the gap or split 9 defined by the two ear portions permits the assembly of the collar with the shaft 3 by a relative radial displacement with a resilient deformation of the two ear portions 7 and, moreover, forms an inner oblique face 11 on the ear portions which is adjacent the end 9 and complementary to a face 12 which has the same obliquity and is located at the end of each of the branches or arms 13 of an intermediate member 14. The latter has a V-sectioned shape whose base has a concave face 15 which marries up with the cylindrical face 17 of the shaft. The two ear portions 7 and the two branches 13 of the intermediate member 14 have aligned apertures 18,18 and 19,19 through which extends a bolt or screw 21 whose screwthreaded end receives a nut 22. The tightening of this screw has for effect to resiliently deform the two ear portions 7 by urging them inwardly towards each other so that the displacement of the oblique faces 11 of the ear portions 7, applied against the oblique ends 12 of the intermediate member 14, radially presses the concave face 15 of the base of the intermediate member in contact with the shaft 3 and thus secures the shaft without play in the collar 1 jointly with the clamping effect exerted by the side walls 6 of the collar on the flat faces 4 of the shaft.

Figure 3:
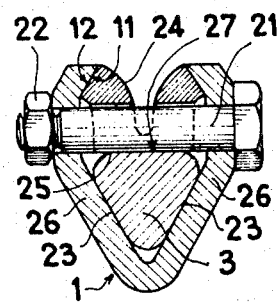
FIGS. 3 and 4 are respectively cross-sectional views of other embodiments of the assembly.

Whereas in FIG. 1 the shaft engaged in the collar 1 has a cylindro-prismatic cross-sectional shape, the shaft shown in FIG. 3 has a purely prismatic and more precisely a triangular-prismatic, shape having two lateral faces 23 in contact with the V-shaped side portions 26 of the collar 1. The third lateral face 27 of the shaft 3 radially engages the face of the plane base 25 of the intermediate member 24. The shaft 3 is locked in the collar 1, under the same conditions as in the embodiment shown in FIG. 1, by the tightening of the bolt or screw 21.

Figure 4:
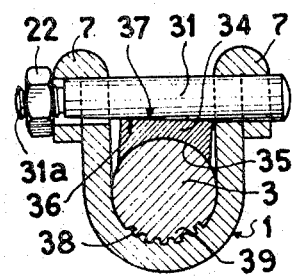

In FIG. 4, the collar 1 has a U-shaped section and includes ear portions 7 having a double thickness owing to the fact that the sheet metal of the collar is bent onto itself in these parts. The shaft 3 has a generally cylindrical shape and the intermediate member 34, which has, as in the embodiment shown in FIG. 1, a cylindrical face 35 bearing against the shaft 3, is inserted directly between the shaft and the tightening means. The latter are in the form of a key or cotter-pin 31 as defined in French standards AFNOR R 321-01, that is, the pin 31 has at the end of a cylindrical body a screw thread 31a formed in a portion having a smaller diameter and an oblique plane face 36 applied against a plane face 37 which is provided on the intermediate member 34 and is parallel to the axis of the shaft 3.

The screwing of the nut 22 on the screwthreaded end portion 31a of the key 31 grips the shaft 3 inside the collar 1, by the effect of the two oblique planar faces 36, 37. The fixing of the shaft is completed by co-acting splines 38, 39 respectively formed in the cylindrical inner face of the collar 1 and in the adjacent face of the shaft 3. The splines have such position and orientation that it is possible to position the collar with respect to the shaft 3 by a transverse movement of the collar causing the shaft to pass through the gap defined by the ear portions 7.

Figure 5:
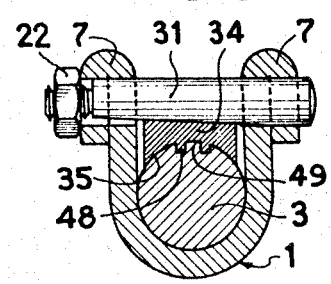
FIG. 5 is a view of a modification of the assembly shown in FIG. 4.

In the modification shown in FIG. 5, the fixing of the shaft is completed by co-acting splines 48, 49 respectively formed in the cylindrical face 35 of the intermediate member 34 and in the upper or corresponding part of the shaft 3. These splines extend longitudinally and are easier to produce, since the broaching operation on the collar required in the embodiment shown in FIG. 1 is avoided. The finished shape can be given to the intermediate member 34 without cutting away material.

In FIG. 6, the collar has a V-shaped section such as that shown in FIG. 3 and the shaft 3 has a triangular cross-sectional shape. The tightening means is a screw or bolt 41 having a flat face 46 parallel to the axis of the screw. The intermediate member is constituted by a wedge 44 having two planar faces which are inclined with respect to each other. The face 47 is in contact with the flat face 46 of the screw 41 and the face 45 is applied against the adjacent lateral face 27 of the prismatic shaft 3.

The intermediate member 44 is normally placed in position after introduction of the tightening screw 41 and its final position is reached by a longitudinal displacement with respect to the shaft, for example produced by means of a hammer, which has for effect to grip the shaft 3 inside the collar 1. In order that the wedge 44 be held in its final position, its narrower end 44a constitutes a tongue portion which is bent into contact with the cylindrical face of the screw as shown in FIG. 7.

FIG. 8 shows that the edges 44b of the wedge 44 have a cylindrical convex shape whereby the wedge 44 can undergo slight angular displacements about an axis perpendicular to the axis of the shaft and perpendicular to the axis of the screw 41 while remaining in contact with the inner faces of ear portions 7. This angular displacement allows the flat face 46 of the screw 41 to remain in coincidence with the plane face 47 of the wedge 44 should the apertures 18 of the ear portions 7 through which the screw 41 extends be offset from each other, the angular displacement of the wedge 44 thus compensating any lack of alignment of the apertures 18.

In FIG. 9 the intermediate member 44 has, as the member 44 shown in FIG. 6, a generally wedge shape but, whereas its face 57 in contact with the tightening screw 41 (identical to that shown in FIG. 6) is planar, its other active face 55 has a cylindrical shape so that it marries up with the face of the shaft 3 which is also cylindrical. The retaining tongue portion 54a (FIG. 10) is defined by two longitudinal slots 58 which facilitate the bending of the tongue portion into contact with the screw 51.

FIG. 11 shows a collar 1 having two ear portions 61a, 61b in a common plane with apertures 62 allowing the passage of two screwthreaded arms 63a, 63b of a clevis 63 which encompasses the collar. An intermediate member 64 which has, if desired, in the free state a slight concavity on the side facing away from the shaft,- grips the shaft 3 inside the collar 1 under the action of two nuts 65a, 65b screwed on the arms 63a, 63b. The branches of the collar 1 moreover have a tendency to move towards each other under the effect of the body of the clevis 63. An extremely intimate contact is ensured in this way between all the parts transmitting the drive. The two ear portions 61a, 61b can have a different orientation, for example they can be parallel to each other, and their dimensions can be reduced to suit particular arrangements depending on the contemplated drive.

The collar 1 shown in FIG. 12 has a V-sectioned shape the two branches of which are provided with an ear portion 71a, 71b. The branches are of different lengths and the ear portion 71b is slightly downwardly offset in a direction parallel to the plane X–X with respect to the other and has a slightly curved shape which defines a convex face 72 for supporting the intermediate member 74. With this arrangement it is easy to achieve in respect of the position of the face 72 a dimension substantially equal to that of the upper face 73 of the shaft 3 which has a convex shape in the presently-described embodiment. The intermediate member 74, which may be planar, is mounted in a first stage in contact with the ear portion 71b. After having screwed the corresponding nut 75b, the adjustment of the clamping of the shaft is achieved by deformation of the intermediate member 74 under the effect of the tightening of the other nut 75a.

The curved shape of the ear portion 71b permits easily achieving, when forming the collar, a precise dimension between the face 72 and the bearing faces for the shaft in the V-shaped portion of the collar.

Having now described my invention what I claim and desire to secure by Letters Patent is :

1. An assembly of a shaft having a longitudinal axis and a face and a universal joint yoke constituted by a cold-formed sheet metal member having a portion defining a collar which encompasses the shaft and has two ear portions defining one throughway split in the collar which split extends in a first plane containing said axis, the ear portions having surfaces spaced apart from each other such distance and said split having such width transversely of said first plane as to allow the collar to be mounted on the shaft by a relative radial displacement of the shaft and collar in said first plane, two branch portions extending from the collar substantially in two spaced planes substantially parallel to said first plane and shaft axis and defining two coaxial apertures for receiving trunnions of a universal joint cross member, the apertures having their axis perpendicular to and intersecting said shaft axis, tightening means extending through the ear portions and having a surface, an intermediate holding member located between the ear portions and having a face which engages said face of the shaft and having at least one other face which co-operates with at least one of said surfaces, whereby a relative displacement between the ear portions, the intermediate member and the tightening means causes the shaft to be gripped inside the collar, said shaft having a portion defining a non-circular keying face and one of two component parts of the assembly consisting of said intermediate member and said collar having a portion defining a non-circular keying face keyingly engaged with the keying face of said shaft.

2. An assembly as claimed in claim 1, wherein said tightening means comprises screwthreaded means extending through apertures in the ear portions.

3. An assembly of a shaft having a longitudinal axis and a face and a universal joint yoke constituted by a sheet metal member having a portion defining a collar which encompasses the shaft and has two ear portions defining a throughway split in the collar which split extends in a first plane containing said axis, the ear portions having surfaces spaced apart from each other such distance and said split having such width transversely of said first plane as to allow the collar to be mounted on the shaft by a relative radial displacement of the shaft and collar in said first plane, two branch portions extending from the collar substantially in two spaced planes substantially parallel to said first plane and shaft axis and defining two coaxial apertures for receiving trunnions of a universal joint cross member, the apertures having their axis perpendicular to and intersecting said shaft axis, tightening means extending through the ear portions and having a face, an intermediate holding member located between the ear portions and having a first face which closely fits against said face on the shaft and having two second faces which engage said surfaces of the ear portions, whereby relative displacements between the ear portions, the intermediate member and the tightening means cause the shaft to be gripped inside the collar, said shaft having a portion defining a non-circular keying face and one of two component parts of the assembly consisting of said intermediate member and said collar having a portion defining a non-circular keying face keyingly engaged with the keying face of said shaft.

4. An assembly as claimed in claim 1, wherein said face of the shaft is cylindrical.

5. An assembly as claimed in claim 1, wherein said face of the shaft is planar.

6. An assembly of a shaft having a face and a universal joint yoke constituted by a sheet metal member having a portion defining a collar which encompasses the shaft and has two ear portions defining a throughway split in the collar and having surfaces, said surfaces being spaced apart from each other such distance and said split having such width as to allow the collar to be mounted on the shaft by a relative radial displacement of the shaft and collar, tightening means extending through the ear portions and having a face, an intermediate holding member located between the ear portions and having a first face which closely fits against said face on the shaft and having two second faces which engage said surfaces of the ear portions, whereby relative displace-ments between the ear portions, the intermediate member and the tightening means cause the shaft to be gripped inside the collar, the intermediate member being substantially V-shaped and comprising two branches and an intermediate portion which interconnects the branches and defines said first face, each of the branches terminating in an oblique face remote from said intermediate portion, said surfaces of the ear portions having the same obliquity as said oblique faces and engaging said oblique faces, said oblique faces of said branches being convergent in a direction away from said shaft so that resiliently urging the ear portions towards each other, by the tightening means, causes the shaft to be gripped radially by the intermediate portion.

7. An assembly of a shaft having a longitudinal axis and a face and a universal joint yoke constituted by a sheet metal member having a portion defining a collar which encompasses the shaft and has two ear portions defining one throughway split in the collar which split extends in a first plane containing said axis, the ear portions having surfaces spaced apart from each other such distance and said split having such width transversely of said first plane as to allow the collar to be mounted on the shaft by a relative radial displacement of the shaft and collar in said first plane, two branch portions extending from the collar substantially in two spaced planes substantially parallel to said first plane and shaft axis and defining two coaxial apertures for receiving trunnions of a universal joint cross member, the apertures having their axis perpendicular to and intersecting said shaft axis, tightening means extending through the ear portions and having a face, an intermediate holding member located between the ear portions and having a first face which closely fits against said face on the shaft and a second face which fits against said face of the tightening means, said second face and said face of the tightening means being such that a relative movement between the tightening means and the intermediate member creates a wedging effect which tends to radially grip the shaft inside the collar, said shaft having a portion defining a non-circular keying face and one of two component parts of the assembly consisting of said intermediate member and said collar having a portion defining a non-circular keying face keyingly engaged with the keying face of said shaft, said ear portions being free to move toward each other about said axis of the shaft and said intermediate holding member being interposed between said ear portions with clearance whereby said ear portions are enabled to be urged toward each other by the tightening effect of said tightening means.

8. An assembly of a shaft or like torque transmitting member having a face and a connecting element comprising a collar constituted by a sheet metal member which encompasses the shaft and has two ear portions defining a throughway split in the collar and having surfaces, said split having a width which allows the collar to be mounted on the shaft by a relative radial displacement of the shaft and collar, tightening means extending through the ear portions and having a face, an intermediate holding member located between the ear portions and having a first face which closely fits against said face on the shaft and a second face which fits against said face of the tightening means, the intermediate member constituting a wedge which is radially pressed against the shaft by the effect of a longitudinal displacement with respect to the tightening means.

9. An assembly as claimed in claim 8, wherein the ear portions have apertures through which the tightening means extend and the wedge has convex edge faces in contact with the ear portions, whereby the wedge is angularly adjustable relative to the ear portions for compensating any possible lack of alignment of the apertures.

10. An assembly as claimed in claim 8, wherein the wedge has a deformed portion which engages the tightening means and holds the wedge in an operative position.

11. An assembly as claimed in claim 7, wherein the tightening means comprises a conventional cotter-pin combined with a tightening nut.

12. An assembly as claimed in claim 2, wherein the shaft has splines coacting with splines on an inner face of the collar and located diametrally opposite the split.

13. An assembly as claimed in claim 7, wherein the shaft has splines coacting with splines on said first face of the intermediate member.

14. An assembly as claimed in claim 1, wherein the collar, including said ear portions, has in a part of the collar in engagement with the shaft a generally U-sectioned shape defining two planar inner faces and two planar faces on the shaft are in engagement with the planar faces of the collar.

15. An assembly of a shaft or like torque transmitting member having a face and a connecting element comprising a collar constituted by a cold-formed sheet metal member which encompasses the shaft and has two ear portions defining a throughway split in the collar and having surfaces, said split having a width which allows the collar to be mounted on the shaft by a relative radial displacement of the shaft and collar, tightening means extending through the ear portions and having a surface, an intermediate holding member located between the ear portions and having a face which engages and marries up with said face of the shaft and at least one other face which co-operates with at least one of said surfaces, whereby a relative displacement between the ear portions, the intermediate member and the tightening means causes the shaft to be gripped inside the collar, the collar having a generally V-sectioned shape defining two planar inner faces which engage two planar faces on the shaft.

16. An assembly as claimed in claim 15, wherein the connecting element is a single-piece press-formed sheet metal member.

17. An assembly as claimed in claim 1, wherein the intermediate member is a sheet metal substantially V-shaped member in section transverse to said axis of the shaft and defines two arm portions having at free ends of the arm portions faces which engage said surfaces of the ear portions, the faces of the arm portions and the surfaces of the ear portions being convergent in a direction away from said axis of the shaft.

18. An assembly of a shaft or like torque transmitting member having a first face and two planar faces, which planar faces make an angle therebetween, and a connecting element comprising a collar constituted by a cold-formed sheet metal substantially V-shaped member which closely engages the major part of the shaft including said two planar faces and has two ear portions defining a throughway split in the collar and having surfaces, said split having a width which allows the collar to be mounted on the shaft by a relative radial displacement of the shaft and collar, a substantially planar intermediate member bearing against said first face of the shaft, a substantially V-shaped member surrounding and closely engaging the substantially V-shaped member and having screwthreaded end portions extending through apertures in the ear portions and apertures in the intermediate member, nuts screwthreadedly engaged on the screwthreaded end portions and urging the intermediate member towards the ear portions and against the shaft.

19. An assembly of a shaft or like torque transmitting member having a face and a connecting element comprising a collar constituted by a cold-formed sheet metal member which encompasses the shaft and has two ear portions defining a throughway split in the collar and having surfaces, said split having a width which allows the collar to be mounted on the shaft by a relative radial displacement of the shaft and collar, an intermediate member bearing against said face of the shaft, a substantially V-shaped member surrounding and engaging the collar and having screwthreaded end portions extending through apertures in the ear portions and apertures in the intermediate member, nuts screwthreadedly engaged on the screwthreaded end portions and urging the intermediate member towards the ear portions and against the shaft, one of the ear portions being outwardly offset in a direction parallel to a median plane between the ear portions and having a convex surface against which the intermediate member bears, said face of the shaft being convex and said shaft having a portion which has a non-circular cross-sectional shape and engages the collar in a portion of the collar having an inner face which marries up with said portion of the shaft having a non-circular cross-sectional shape.

20. An assembly of a shaft or like torque transmitting member whose cross-section comprises a first portion defining a face and a second portion having a non-circular shape and a connecting element comprising a collar constituted by a cold-formed sheet metal member which encompasses the shaft and has two ear portions defining a throughway split in the collar and having surfaces, said split having a width which allows the collar to be mounted on the shaft by a relative radial displacement of the shaft and collar, an intermediate member bearing against said face of the shaft, a substantially V-shaped member surrounding and engaging the collar and having screwthreaded end portions extending through apertures in the ear portions and apertures in the intermediate member, nuts screwthreadedly engaged on the screwthreaded end portions and urging the intermediate member towards the ear portions and against the shaft, said non-circular portion being substantially V-sectioned and said collar having an inner contour which substantially marries up with and engages said second portion of the cross-section of the shaft.

* * * * *